(12) United States Patent
Schneider et al.

(10) Patent No.: US 7,770,926 B2
(45) Date of Patent: Aug. 10, 2010

(54) AIRBAG ADAPTIVE VENTING FOR OUT-OF-POSITION OCCUPANTS

(75) Inventors: David W. Schneider, Waterford, MI (US); Larry D. Rose, South Weber, UT (US)

(73) Assignee: Autoliv ASP, Inc., Ogden, UT (US)

( * ) Notice: Subject to any disclaimer, the term of this patent is extended or adjusted under 35 U.S.C. 154(b) by 244 days.

(21) Appl. No.: 11/836,499

(22) Filed: Aug. 9, 2007

(65) Prior Publication Data

US 2009/0039630 A1 Feb. 12, 2009

(51) Int. Cl.
*B60R 21/239* (2006.01)

(52) U.S. Cl. .................. 280/743.2; 280/739; 280/740

(58) Field of Classification Search ............. 280/743.2, 280/739, 740
See application file for complete search history.

(56) References Cited

U.S. PATENT DOCUMENTS

| | | |
|---|---|---|
| 5,016,913 A | 5/1991 | Nakajima et al. |
| 5,172,933 A | 12/1992 | Strasser |
| 5,246,250 A | 9/1993 | Wolanin et al. |
| 5,280,953 A | 1/1994 | Wolanin et al. |
| 5,290,953 A | 3/1994 | Clark, Jr. et al. |
| 5,306,043 A | 4/1994 | Mihm et al. |
| 5,350,188 A | 9/1994 | Sato |
| 5,405,166 A | 4/1995 | Rogerson |
| 5,421,607 A | 6/1995 | Gordon |
| 5,492,363 A | 2/1996 | Hartmeyer et al. |
| 5,494,314 A | 2/1996 | Kriska et al. |
| 5,603,526 A | 2/1997 | Buchanan |
| 5,931,497 A | 8/1999 | Fischer |
| 6,056,318 A | 5/2000 | Braunschadel |
| 6,095,557 A | 8/2000 | Takimoto et al. |
| 6,126,196 A | 10/2000 | Zimmerman |
| 6,139,048 A | 10/2000 | Braunschadel |
| 6,183,003 B1 | 2/2001 | Matsuhashi et al. |
| 6,206,408 B1 | 3/2001 | Schneider |
| 6,290,257 B1 | 9/2001 | Bunce et al. |
| 6,371,509 B1 | 4/2002 | Ellerbrok et al. |
| 6,398,258 B2 | 6/2002 | Hamada et al. |
| 6,631,921 B1 | 10/2003 | Drossler et al. |
| 6,631,922 B2 | 10/2003 | Hess et al. |
| 6,648,371 B2 | 11/2003 | Vendely et al. |
| 6,746,045 B2 | 6/2004 | Short et al. |

(Continued)

FOREIGN PATENT DOCUMENTS

DE 196 40 322 3/1996

(Continued)

OTHER PUBLICATIONS

Office Action issued Nov. 12, 2088 in co-pending U.S. Appl. No. 11/528,265.

(Continued)

*Primary Examiner*—Paul N Dickson
*Assistant Examiner*—Drew Brown
(74) *Attorney, Agent, or Firm*—Sally J Brown; Stoel Rives, LLP

(57) ABSTRACT

An airbag assembly is disclosed for use in an automobile. The disclosed airbag assembly adaptively vents gas from the interior of the airbag depending on whether an obstruction is encountered during airbag deployment.

15 Claims, 7 Drawing Sheets

U.S. PATENT DOCUMENTS

| | | | |
|---|---|---|---|
| 6,773,027 | B2 | 8/2004 | Bohn et al. |
| 6,773,030 | B2 | 8/2004 | Fischer |
| 6,832,778 | B2 | 12/2004 | Pinsenschaum et al. |
| 6,863,304 | B2 | 3/2005 | Reiter et al. |
| 6,918,613 | B2 | 7/2005 | Short et al. |
| 6,932,385 | B2 | 8/2005 | Hawthorn et al. |
| 6,971,671 | B2 | 12/2005 | Schneider et al. |
| 7,059,634 | B2 | 6/2006 | Bossecker et al. |
| 7,083,191 | B2 | 8/2006 | Fischer |
| 7,083,192 | B2 | 8/2006 | Fischer et al. |
| 7,210,702 | B2 | 5/2007 | Soderquist |
| 7,237,802 | B2 | 7/2007 | Rose et al. |
| 7,328,915 | B2 | 2/2008 | Smith et al. |
| 7,347,450 | B2 | 3/2008 | Williams et al. |
| 7,360,789 | B2 | 4/2008 | Bito |
| 7,364,192 | B2 | 4/2008 | Braun et al. |
| 7,475,906 | B2 * | 1/2009 | Goto et al. ............... 280/743.2 |
| 7,556,290 | B2 | 7/2009 | Williams et al. |
| 7,568,729 | B2 | 8/2009 | Schnieder et al. |
| 7,597,355 | B2 | 10/2009 | Williams et al. |
| 7,597,356 | B2 | 10/2009 | Williams |
| 7,614,653 | B2 | 11/2009 | Rose et al. |
| 7,614,654 | B2 | 11/2009 | Williams |
| 2003/0020266 | A1 | 1/2003 | Vendely et al. |
| 2003/0020268 | A1 | 1/2003 | Reiter et al. |
| 2003/0057691 | A1 | 3/2003 | Tokita et al. |
| 2003/0127839 | A1 | 7/2003 | Jenkins |
| 2003/0209895 | A1 | 11/2003 | Gu |
| 2003/0214125 | A1 | 11/2003 | Schneider et al. |
| 2004/0012179 | A1 | 1/2004 | Pinsenschaum et al. |
| 2004/0056459 | A1 | 3/2004 | Kassman et al. |
| 2004/0090054 | A1 | 5/2004 | Bossecker et al. |
| 2004/0130135 | A1 | 7/2004 | Ekdahl |
| 2004/0188990 | A1 | 9/2004 | Short et al. |
| 2004/0256842 | A1 | 12/2004 | Breed et al. |
| 2005/0052008 | A1 | 3/2005 | Rose et al. |
| 2005/0236822 | A1 | 10/2005 | Rose et al. |
| 2005/0248137 | A1 | 11/2005 | Delventhal et al. |
| 2006/0071461 | A1 | 4/2006 | Williams et al. |
| 2006/0071462 | A1 | 4/2006 | Smith et al. |
| 2006/0151979 | A1 | 7/2006 | DePottey et al. |
| 2006/0197327 | A1 | 9/2006 | Maripudi et al. |
| 2007/0052222 | A1 | 3/2007 | Higuchi et al. |
| 2007/0108750 | A1 | 5/2007 | Bauer et al. |
| 2007/0126218 | A1 | 6/2007 | Schnieder et al. |
| 2007/0126219 | A1 | 6/2007 | Williams |
| 2007/0132222 | A1 | 6/2007 | Thomas et al. |
| 2007/0205590 | A1 | 9/2007 | Klinkenberger et al. |
| 2008/0007038 | A1 | 1/2008 | Fischer et al. |
| 2008/0018086 | A1 | 1/2008 | Ford et al. |
| 2008/0023950 | A1 * | 1/2008 | Kalczynski et al. ......... 280/739 |
| 2008/0023959 | A1 | 1/2008 | Crawford |
| 2008/0042416 | A1 * | 2/2008 | Razazi et al. ............ 280/743.2 |
| 2008/0073890 | A1 * | 3/2008 | Williams et al. ............ 280/739 |
| 2008/0073891 | A1 * | 3/2008 | Rose et al. .................. 280/739 |
| 2008/0073892 | A1 | 3/2008 | Rose et al. |
| 2008/0073893 | A1 * | 3/2008 | Schneider .................. 280/740 |
| 2008/0079250 | A1 | 4/2008 | Boyle et al. |
| 2008/0303256 | A1 | 12/2008 | Williams |

FOREIGN PATENT DOCUMENTS

| | | |
|---|---|---|
| EP | 1824710 | 6/2009 |
| JP | 05085295 | 4/1993 |
| JP | 2001-158315 | 6/2001 |

OTHER PUBLICATIONS

Office Action issued Nov. 18, 2008 in co-pending U.S. Appl. No. 11/528,265.
Preliminary Amendment filed Jun. 8, 2007 in co-pending U.S. Appl. No. 11/589,316.
Office Action issued Nov. 17, 2008 in co-pending U.S. Appl. No. 11/589,316.
Interview Summary issued Dec. 19, 2008 in co-pending U.S. Appl. No. 11/589,316.
Office Action issued Mar. 15, 2006 in co-pending U.S. Appl. No. 10/832,843.
Response to First Office Action filed in co-pending U.S. Appl. No. 10/832,843.
Interview Summary issued Jun. 15, 2006 in co-pending U.S. Appl. No. 10/832,843.
Notice of Allowance issued Jun. 22, 2006 in co-pending U.S. Appl. No. 10/832,843.
Request for Continued Examination filed Sep. 20, 2006 in co-pending U.S. Appl. No. 10/832,843.
Notice of Allowance issued Oct. 3, 2006 in co-pending U.S. Appl. No. 10/832,843.
Office Action issued Sep. 27, 2006 in co-pending U.S. Appl. No. 10/959,387.
Interview Summary issued Jan. 23, 2007 in co-pending U.S. Appl. No. 10/959,387.
Amendment and Response to Office Action filed Feb. 20, 2007 in co-pending U.S. Appl. No. 10/959,387.
Office Action issued May 2, 2007 in co-pending U.S. Appl. No. 10/959,387.
Office Action issued May 2, 2007 in co-pending U.S. Appl. No. 10/959,387.
Amendment and Response to Office Action filed Aug. 7, 2007 in co-pending U.S. Appl. No. 10/959,387.
Notice of Allowance issued Oct. 5, 2007 in co-pending U.S. Appl. No. 10/959,387.
Office Action issued Jun. 8, 2007 in co-pending U.S. Appl. No. 11/296,031.
Amendment and Response to Office Action filed Dec. 4, 2007 in co-pending U.S. Appl. No. 11/296,031.
Office Action issued Apr. 21, 2008 in co-pending U.S. Appl. No. 11/296,031.
Amendment and Response to Office Action filed Jul. 21, 2008 in co-pending U.S. Appl. No. 11/296,031.
Office Action issued Oct. 21, 2008 in co-pending U.S. Appl. No. 11/296,031.
Preliminary Amendment filed Mar. 10, 2005 in co-pending U.S. Appl. No. 10/959,256.
Office Action issued Nov. 15, 2006 in co-pending U.S. Appl. No. 10/959,256.
Interview Summary issued Jan. 23, 2007 in co-pending U.S. Appl. No. 10/959,256.
Amendment and Response to Office Action filed Feb. 15, 2007 in co-pending U.S. Appl. No. 10/959,256.
Office Action issued May 21, 2007 in co-pending U.S. Appl. No. 10/959,256.
Amendment and Response to Office Action filed Aug. 16, 2007 in co-pending U.S. Appl. No. 10/959,256.
Notice of Allowance issued Nov. 27, 2007 in co-pending U.S. Appl. No. 10/959,256.
Office Action issued Jan. 2, 2009 in co-pending U.S. Appl. No. 11/528,042.
Office Action issued Jul. 11, 2008 in co-pending U.S. Appl. No. 11/528,118.
Amendment and Response to Office Action filed Nov. 24, 2008 in co-pending U.S. Appl. No. 11/528,118.
Interview Summary issued Dec. 15, 2008 in co-pending U.S. Appl. No. 11/528,118.
Notice of Allowance issued Feb. 10, 2009 in co-pending U.S. Appl. No. 11/528,118.
Office Action issued Jun. 30, 2008 in co-pending U.S. Appl. No. 11/528,266.
Amendment and Response to Office Action filed Dec. 1, 2008 in co-pending U.S. Appl. No. 11/528,266.
Interview Summary issued Dec. 16, 2008 in co-pending U.S. Appl. No. 11/528,266.
Notice of Allowance issued Jan. 14, 2009 in co-pending U.S. Appl. No. 11/528,266.

Summary of Interview filed Jan. 16, 2009 in co-pending U.S. Appl. No. 11/528,266.
Office Action issued Dec. 2, 2008 in co-pending U.S. Appl. No. 11/758,419.
Office Action issued Apr. 7, 2008 in co-pending U.S. Appl. No. 11/295,953.
Office Action issued Jul. 1, 2008 in co-pending U.S. Appl. No. 11/295,953.
Amendment and Response to Office Action filed Dec. 1, 2008 in co-pending U.S. Appl. No. 11/295,953.
Office Action issued Sep. 26, 2006 in co-pending U.S. Appl. No. 11/031,394.
Interview Summary issued Jan. 23, 2007 in co-pending U.S. Appl. No. 11/031,394.
Amendment and Response to Office Action filed Mar. 26, 20027 in co-pending U.S. Appl. No. 11/031,394.
Notice of Allowance issued May 7, 2007 in co-pending U.S. Appl. No. 11/031,394.
Office Action issued Jun. 25, 2007 in co-pending U.S. Appl. No. 11/031,394.
Notification of Transmittal of the International Search Report and the Written Opinion of the International Searching Authority issued Oct. 19, 2006 in International Application No. PCT/US2005/025416.
Notification of Transmittal of the International Search Report and the Written Opinion of the International Searching Authority issued Dec. 15, 2006 in International Application No. PCT/US2005/027255.
Notification of Transmittal of the International Search Report and the Written Opinion of the International Searching Authority issued Aug. 20, 2007 in International Application No. PCT/US2006/045367.
Notification of Transmittal of the International Search Report and the Written Opinion of the International Searching Authority issued Sep. 5, 2007 in International Application No. PCT/US2006/045441.
Notification of Transmittal of the International Search Report and the Written Opinion of the International Searching Authority issued Mar. 9, 2007 in International Application No. PCT/US2005/038175.
Notification of Transmittal of the International Search Report and the Written Opinion of the International Searching Authority issued Oct. 22, 2008 in International Application No. PCT/US2008/001337.
Notification of Transmittal of the International Search Report and the Written Opinion of the International Searching Authority issued Aug. 15, 2008 in International Application No. PCT/US2008/060226.
Notice of Allowance issued Apr. 2, 2009 in co-pending U.S. Appl. No. 11/295,953.
Amendment and Response to Office Action filed Apr. 20, 2009 in co-pending U.S. Appl. No. 11/296,031.
Notice of Allowance issued Mar. 23, 2009 in co-pending U.S. Appl. No. 11/528,118.
Office Action issued Mar. 19, 2009 in co-pending U.S. Appl. No. 11/528,266.
Amendment and Response to Office Action filed Apr. 17, 2009 in co-pending U.S. Appl. No. 11/589,316.
Amendment and Response to Office Action filed Apr. 21, 2009 in co-pending U.S. Appl. No. 11/758,419.
Amendment and Response to Office Action filed Mar. 16, 2009 in co-pending U.S. Appl. No. 11/528,265.
Amendment and Response to Office Action filed Jul. 2, 2009 in co-pending U.S. Appl. No. 11/528,042.
Notice of Allowance issued Jul. 29, 2009 in co-pending U.S. Appl. No. 11/296,031.
Notice of Allowance issued Jun. 16, 2009 in co-pending U.S. Appl. No. 11/528,265.
Notice of Allowance issued Jun. 17, 2009 in co-pending U.S. Appl. No. 11/589,316.
Notice of Allowance issued Jun. 19, 2009 in co-pending U.S. Appl. No. 11/758,419.
Amendment and Response to Office Action filed Sep. 9, 2009 in co-pending U.S. Appl. No. 11/528,266.
Disapproved Terminal Disclaimer issued Sep. 9, 2009 in co-pending U.S. Appl. No. 11/528,266.
Terminal Disclaimer and Statement filed Oct. 19, 2009 in co-pending U.S. Appl. No. 11/528,266.
Final Office Action issued Oct. 21, 2009 in co-pending U.S. Appl. No. 11/528,266.
Approved Terminal Disclaimer issued Oct. 19, 2009 in co-pending U.S. Appl. No. 11/528,266.
Notice of Allowance and Fee(s) Due issued Dec. 16, 2009 in co-pending U.S. Appl. No. 11/528,266.
Notice of Allowance and Fee(s) Due issued Nov. 5, 2009 in co-pending U.S. Appl. No. 11/528,042.

* cited by examiner

AIRBAG ADAPTIVE VENTING FOR OUT-OF-POSITION OCCUPANTS

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings as listed below.

Figure 1A:
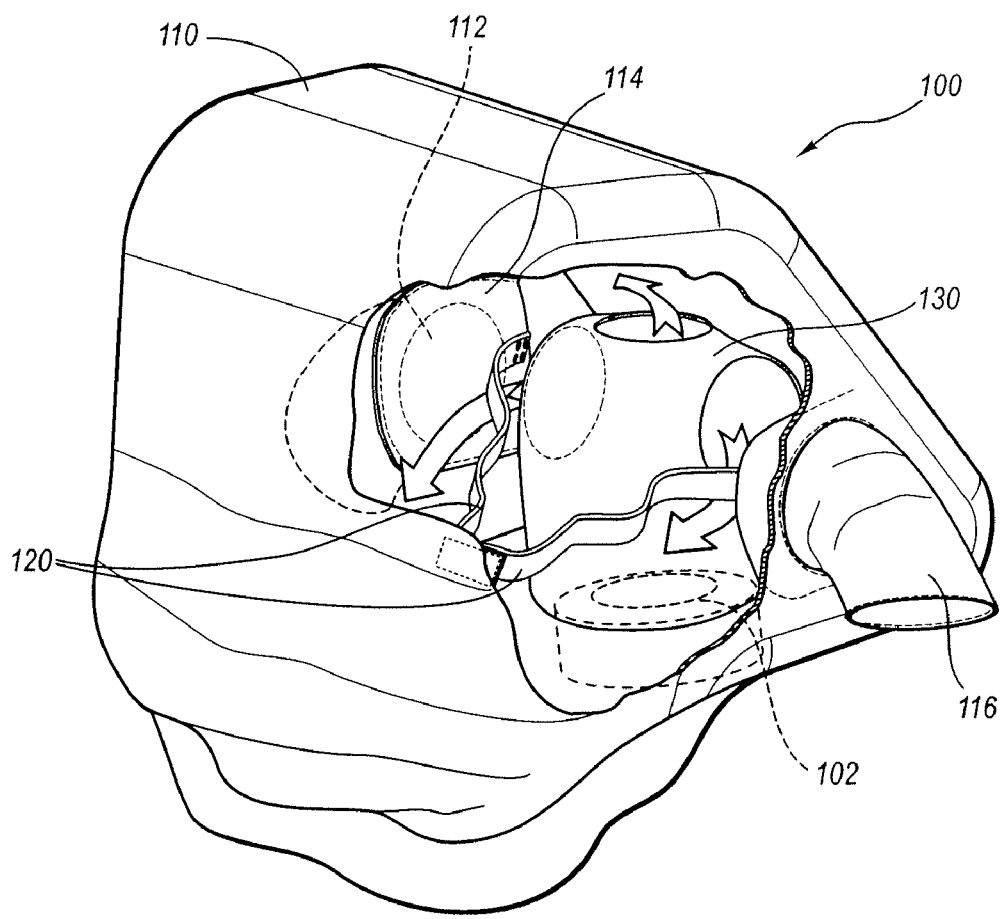
FIG. 1A is a partial cutaway perspective view of one embodiment of an airbag assembly during initial cushion membrane deployment.

INDEX OF ELEMENTS IDENTIFIED IN THE DRAWINGS 10 vehicle
20 instrument panel
40 windshield
50 occupant
100 airbag module
102 inflator housing
110 airbag cushion membrane
112 aperture
114 aperture cover
116 exhaust manifold
120 control tether
122 vent portion of tether
124 middle portion of tether
126 membrane portion of tether
130 diffuser
132 diffuser aperture
140 breakaway stitching
150 fixed vent
310 airbag cushion membrane
312 aperture
314 aperture cover
320 control tether
322 cover portion of control tether
324 middle portion of control tether
326 membrane portion of control tether
340 breakaway stitching
410 airbag cushion membrane
412 aperture
414 aperture cover
420 control tether
422 cover portion of control tether
424 middle portion of control tether
426 membrane portion of control tether
440 breakaway stitching
460 perforations

DETAILED DESCRIPTION OF PREFERRED EMBODIMENTS

Described below are embodiments of an airbag cushion and venting mechanism. As those of skill in the art will appreciate, the principles of the invention may be applied to and used with a variety of airbag deployment systems including frontal driver and passenger airbags, knee airbags, overhead airbags, curtain airbags, and the like. Thus, the present invention is applicable to airbag cushions of various shapes and sizes.

Airbag cushions are frequently located in an instrument panel and directly in front of an occupant. During a collision, an airbag cushion inflates and deploys through a cosmetic cover. The airbag cushion deploys towards the occupant and provides a restraint.

Full inflation of an airbag is not always desired. For example, partial inflation offers optimal protection when the occupant being protected by the airbag cushion is a child, a baby in a rear facing car seat or an adult positioned too close to the air bag cushion. Such conditions are referred to as out-of-position conditions. Embodiments described below provide an airbag cushion that responds to an occupant's position and vents accordingly to avoid excessive deploying impact.

Embodiments disclosed herein permit response to occupant position and vents accordingly. Each embodiment has a closeable opening for venting gas referred to as an optionally closeable vent for out-of-position (OOP) conditions, wherein the vent is initially deployed in an at least partially closed configuration. Each closeable vent may be opened via a component such as a control tether or cord. The tether may be connected at one end to a vent and at an opposing end elsewhere within or on the cushion. A diffuser may also be positioned in the cushion to optimize the flow of gas out of the closeable vents. Additionally fixed vents, which are not closeable may be incorporated into the inflatable cushion membrane.

If an occupant is in close proximity to the deploying airbag and restricts normal inflation, the closeable vent remains open and allows gas to rapidly escape. If the occupant is in a normal position and inflation is unrestricted, the tension pulls on the tether until the tether no longer opens the closeable vent. Closure retains gas for normal occupant restraint. Thus, the closeable vent may be used as a variable feature in out-ofposition conditions and in normal restraint conditions. In this manner, the airbag cushion is sensitive to obstructive expansion of the cushion.

FIG. 1A depicts one embodiment of an airbag assembly 100 from a partially cutaway perspective view during initial airbag deployment. Airbag assembly 100 may typically be housed in an instrument panel or steering wheel within a vehicle and may comprise an airbag membrane 110, one or more control tethers 120, an optional diffuser 130, an optional fixed vent (not shown), and an optional exhaust manifold 116.

Cushion membrane 110 may comprise at least one aperture 112, at least one aperture cover 114, and at least one exhaust manifold 116. Aperture 112 may be called a vent, and aperture cover 114 may be called a vent cover. Further, aperture 112 and aperture cover 114 may collectively be called a closeable vent.

Cushion membrane 110 may be manufactured from a pliable woven material known to one skilled in the relevant art. Cushion membrane 110 may be attached to inflator housing 102, which in turn may be anchored within a vehicle.

Aperture 112 is formed in cushion membrane 110 and is in fluid communication with the interior of cushion membrane 110, such that aperture 112 may vent inflation gas from the interior to the exterior of cushion membrane 110. FIG. 1A depicts aperture 112 as being circular in shape and of a specific size, however, aperture 112 may be of any shape or size which is suitable for venting inflation gas such that in case of contact with an out of position occupant, cushion membrane 110 is sufficiently soft. Further the location of aperture 112 is purely illustrative and may vary depending on application.

Aperture cover 114 may be formed from any suitable material, and in FIG. 1A it is depicted as being made from the same material as the cushion membrane. Cover 114 is attached to cushion membrane 110 on at least three sides of aperture 112, and in a resting state, cover 114 completely covers aperture 112. Cover 114 is not attached to membrane 110 on one side and it is this free side that may be pulled away from aperture 112 to allow inflation gas to be vented from the interior of membrane 110. Cover 114 may be attached to membrane 110 via stitching, gluing, welding, or in any other suitable manner.

Exhaust manifold 116 is an optional component of airbag assembly 100. Manifold 116 is attached to the exterior surface of cushion membrane 110 and completely surrounds aperture 112. Thus, manifold 116 forms a tube through which inflation gas may be directed. Exhaust manifold 116 may be formed from any suitable material and may be attached to membrane 110 via any suitable method such as stitching, gluing, and welding.

Control tether 120 is configured to operate vent cover 114 by coupling the expansion of membrane 110 with pulling open vent cover 114. Tether 120 may be formed from an elongated piece of woven nylon material or any other suitable material. Tether 120 may be releasably attached to vent cover 114 via break-away stitching or any other releasable attachment. Tether 120 further comprises an elongated middle portion which extends to a surface of cushion membrane 110. The elongated middle portion is configured such that during initial airbag deployment, tether 120 is slack and does not open aperture cover 114. In the depiction of FIG. 1A tether 120 is attached to an occupant-proximal surface of airbag cushion membrane 110. In other embodiments, tether 120 may be coupled to any surface of cushion membrane 110, including an instrument panel-proximal surface of membrane 110, which expands sufficiently to allow tether 120 to operate aperture cover 114.

FIG. 1A depicts two control tethers, each fixedly attached to membrane 110. In other embodiments, one contiguous piece of material could be used to connect both vent covers to membrane 110. That contiguous control tether may be fixedly attached to membrane 110, or slideably attached via a loop of material protruding from membrane 110, which slideably receives the contiguous control tether. Further, control tether 120 could comprise an integral extension of airbag membrane 110, or of vent cover 114.

Diffuser 130 is an optional component of airbag assembly 100, and may be of any suitable type known in the art, and in the embodiment of FIG. 1A, it is depicted as a piece of pliable fabric with three apertures. During initial airbag deployment, inflation gas (depicted as arrows) exits inflator housing 102 and enters diffuser 130, from which the inflation gas exits via the apertures. Diffuser 130 may be configured such that during initial airbag deployment the apertures of diffuser 130 do not align with vent apertures 112. It is not necessary that diffuser 130 apertures be misaligned with vent apertures 112 because vent cover 114 completely covers vent aperture 112 during initial airbag deployment. Note that in other embodiments, the optional diffuser may have other shapes and the openings may have different sizes and numbers. Further, diffuser 130 may be a contiguous, integral extension of airbag cushion membrane 110.

During a collision event, inflation of airbag assembly 100 is triggered by vehicle sensors and inflation gas rapidly begins to fill airbag membrane 110. During this initial stage of airbag deployment, control tethers 120 remain slack and vent covers 112 remains completely covering vent aperture 112.

Figure 1B:
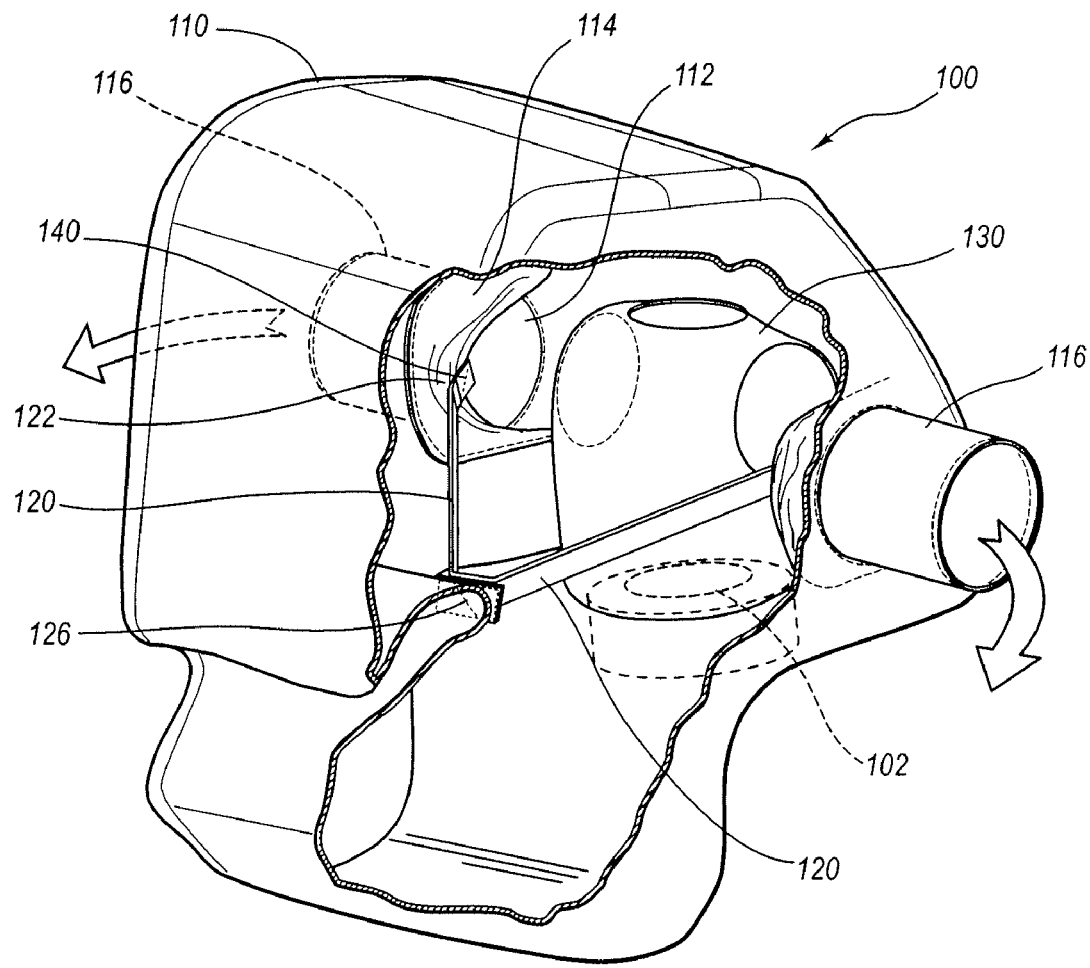
FIG. 1B is a partial cutaway perspective view of the airbag assembly of FIG. 1A during mid-cushion membrane deployment.

FIG. 1B is a partially cutaway perspective view of the airbag assembly of FIG. 1A, wherein the airbag assembly is in mid-airbag deployment without obstruction. In the depiction of FIG. 1B airbag deployment has proceeded from initial airbag deployment, depicted in FIG. 1A, to a state of deployment wherein the airbag cushion volume is greater than that of FIG. 1A.

Control tethers 120 are depicted as being under tension and tether middle portion is fully extended due to the expansion of the occupant-proximal surface of airbag membrane 110 away from the instrument panel. This tension is transmitted to the unstitched side of vent cover 114, which results in vent cover 114 being pulled away from vent aperture 112. Inflation gas (depicted as arrows) may be able to exit the interior of cushion membrane 110.

The amount of gas able to escape during airbag deployment without obstruction is minimal, for two reasons. First, this intermediate stage of airbag deployment without obstruction only exists for a very small fraction of a second. The other reason is due to the Bernoulli effect—pressure is lower in a moving fluid than in a stationary fluid. For example, if the convex side of a spoon is placed into a smooth stream of water from a faucet, the spoon is pulled into the stream. The higher pressure outside the moving fluid pushes the spoon into the lower pressure water. In an airbag deployment, the high velocity stream of gas flowing into the cushion creates a similar effect for approximately 30 milliseconds. Inflation gas that does escape exits via the optional exhaust manifolds 116.

Although tethers 120 are under tension during mid-airbag deployment, the amount of tension is not yet enough to tear breakaway stitching 140 from tether vent portion 122 from vent cover 114. Membrane portion 126 of tether 120 remains securely attached to membrane 110.

Figure 1C:
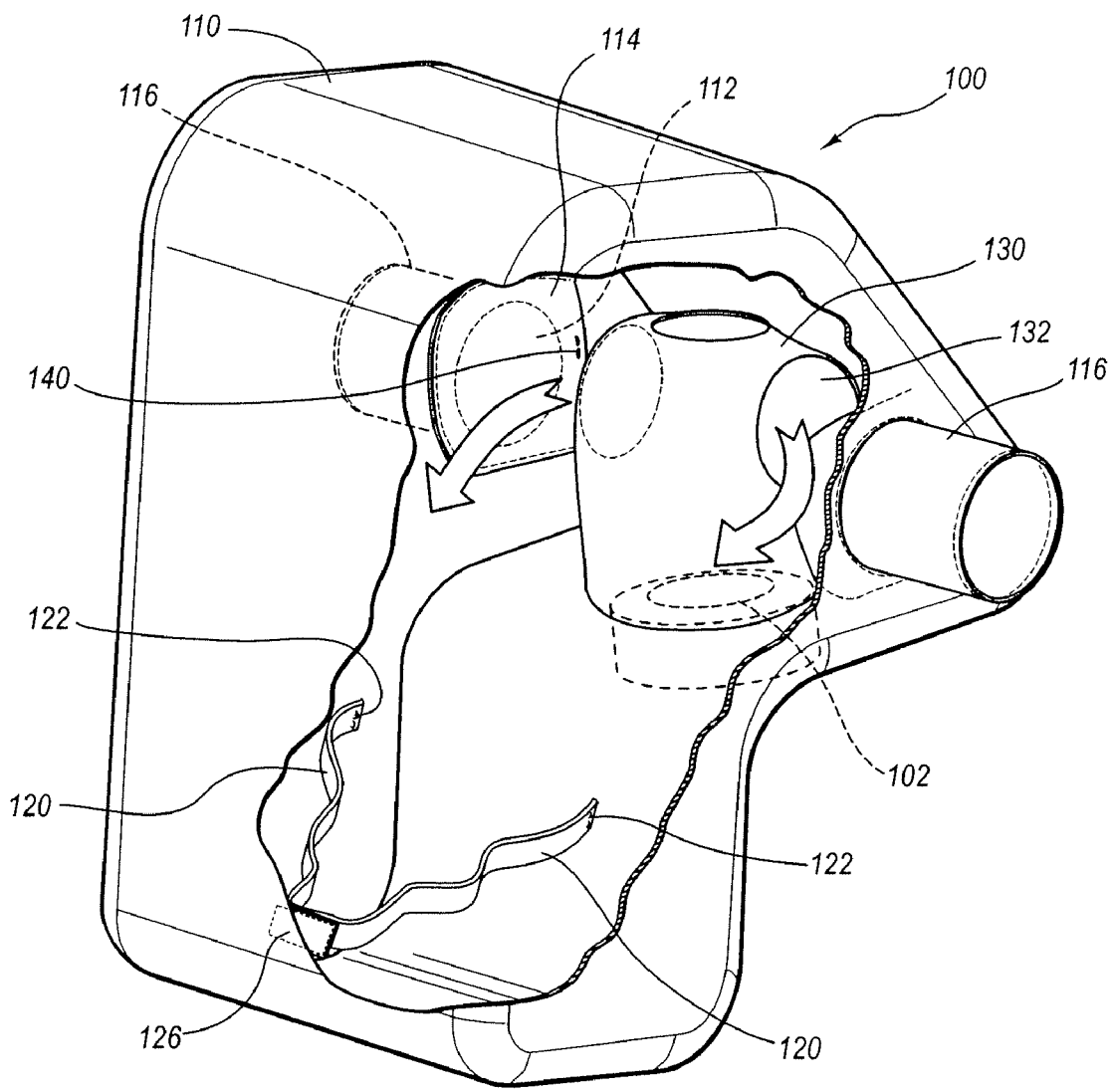
FIG. 1C is a partial cutaway perspective view of the airbag assembly of FIG. 1A during full cushion membrane deployment.

FIG. 1C is a partial cutaway perspective view of the airbag assembly of FIG. 1A wherein the airbag has been fully deployed without obstruction. In this depiction, inflation gas has continued to enter the interior of airbag membrane 110 through inflator housing 102 and diffuser 130, and diffuser apertures 132. Airbag membrane 110 has fully expanded which exerts sufficient tension on control tether 120 to cause breakaway stitching 140 to rupture, while membrane portion 126 remains fixedly attached to membrane 110.

Rupture of stitching 140 allows vent portion 122 of tether 120 to become separated from vent cover 114. Since aperture cover 114 is no longer being pulled away from aperture 112, aperture cover 114 completely covers aperture 112. Expansion of airbag membrane 110 causes aperture cover 114 to tightly cover aperture 112, such that very little inflation gas is able to escape the interior of membrane 110 through aperture 112, resulting in a fully inflated airbag cushion which may sufficiently cushion an occupant properly seated in a vehicle.

Figure 2A:
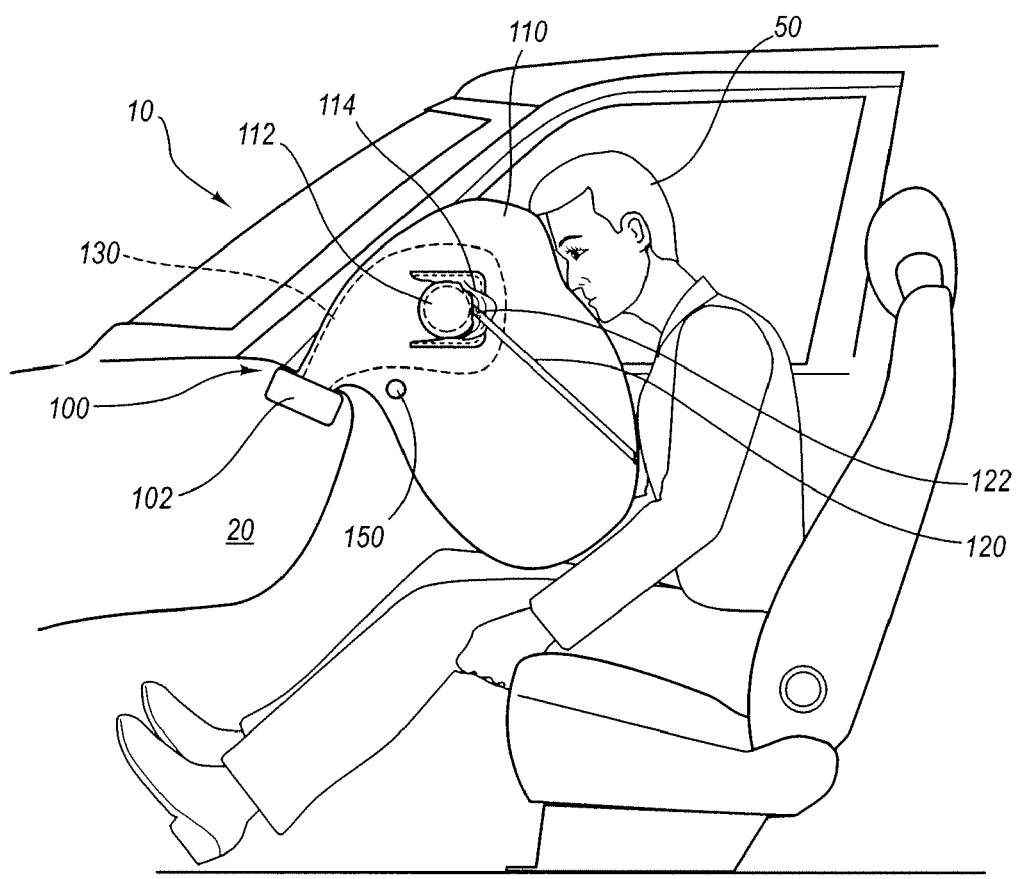
FIG. 2A is a side elevation view the airbag assembly of FIG. 1A during cushion membrane deployment in the presence of an out of position occupant.

FIG. 2A depicts a side elevation view of the airbag assembly of FIG. 1A, wherein the airbag is in mid-deployment and has contacted an out of position occupant 50. Out of position occupant 50 in vehicle 10 may also be a child, a child's car seat, an adult who is not wearing a restraining device, or an individual who is positioned too close to instrument panel 20.

Airbag membrane 110 is partially inflated, such that tension is applied to control tether 120. Occupant 50 blocks further expansion of membrane 110 such that tether 120 remains taut, but vent portion 122 of tether 120 is not torn away from aperture cover 114. Thus, vent cover 114 is pulled away from vent aperture 112 by tether 120, and inflation gas may be vented through optional diffuser 130 and aperture 112. The venting of inflation gas softens the cushion to provide appropriate cushioning for occupant 50.

Also visible in this view is one of two bilaterally disposed fixed vents 150. Airbag assembly 100 may comprise at least one fixed vent 150, which provide consistent venting of the airbag cushion membrane 110 and are not restricted by an occupant's position. In addition to remaining open, fixed vent 150 also differs from closeable vent (comprising vent aperture 112 and aperture cover 114) in that fixed vent 150 is typically smaller. Fixed vent 150 may be optional in certain cushion embodiments based on venting requirements. The location of fixed vent 150 may vary as does the number of fixed vents 150.

Figure 2B:
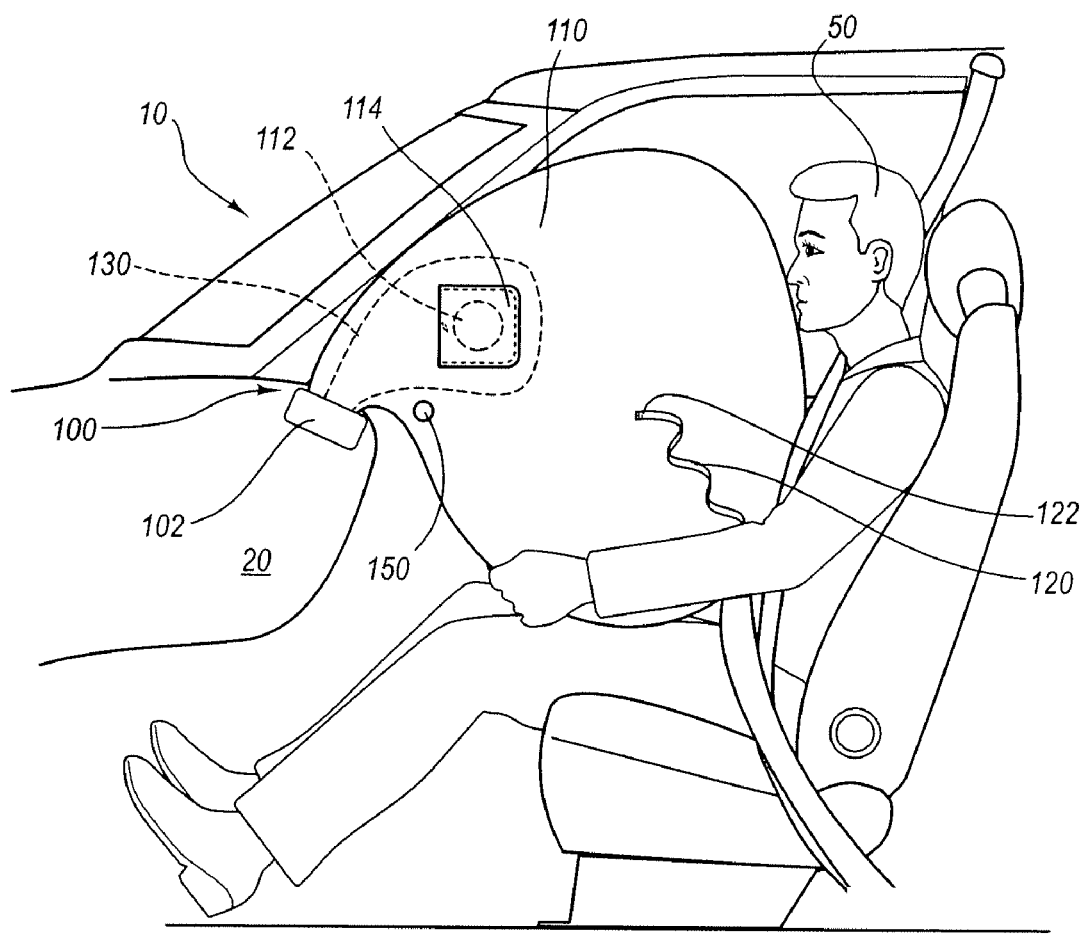
FIG. 2B is a side elevation view the airbag assembly of FIG. 1A during unobstructed cushion membrane deployment in the presence of a normally seated occupant.

FIG. 2B is a side elevation view of airbag assembly 100 of FIGS. 1A-1C, wherein the airbag is fully deployed without obstruction. Occupant 50 is far enough away from instrument panel 20 that upon airbag deployment, cushion membrane 110 may fully expand without obstruction. Full expansion of cushion membrane 110 causes sufficient tension to be applied to control tether 120 that breakaway stitching attaching vent portion 122 of control tether 120 to vent cover 114 is ruptured.

The expansion of membrane 110 coupled with the release of control tether 120 causes vent cover 114 to fully and tightly cover aperture 112, limiting the exit of inflation gas through aperture 112. Fixed vent 150 is still able to vent inflation gas from the interior of cushion membrane 110. Diffuser 130 may still be positioned such that the diffuser apertures are still aligned with vent apertures 112, or the diffuser may collapse within membrane 112, since inflation gas is no longer entering membrane 112 via inflator housing 102 and diffuser 130.

Figure 3A:
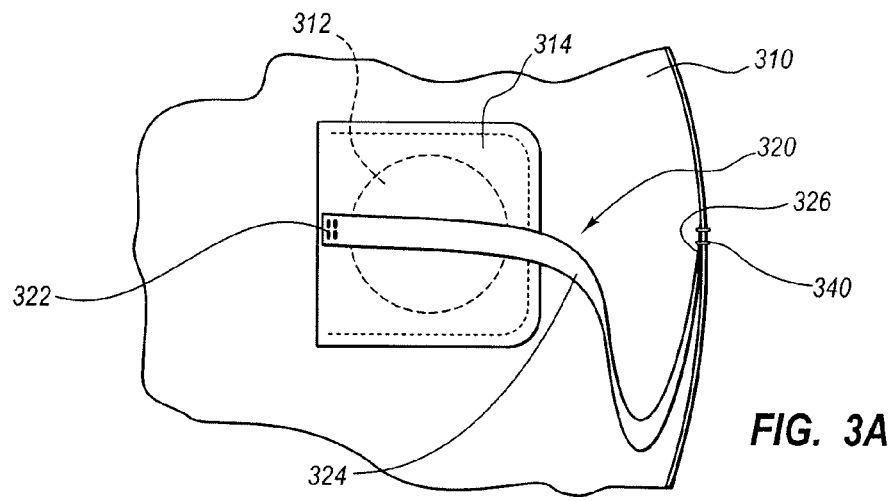
FIG. 3A is a side elevation cutaway view detailing some components of another embodiment of an airbag assembly during initial airbag deployment.
Figure 3B:
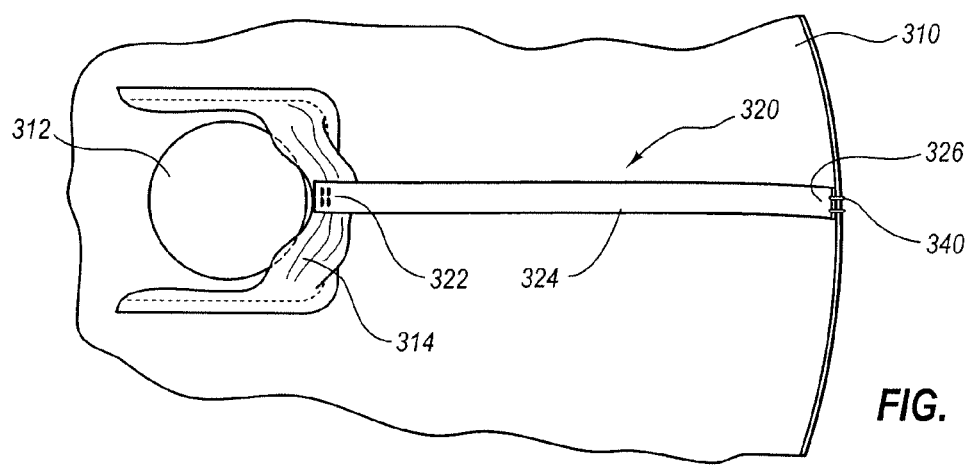
FIG. 3B is a side elevation cutaway view of the airbag assembly of FIG. 3A during mid-airbag deployment, or airbag deployment with obstruction.
Figure 3C:
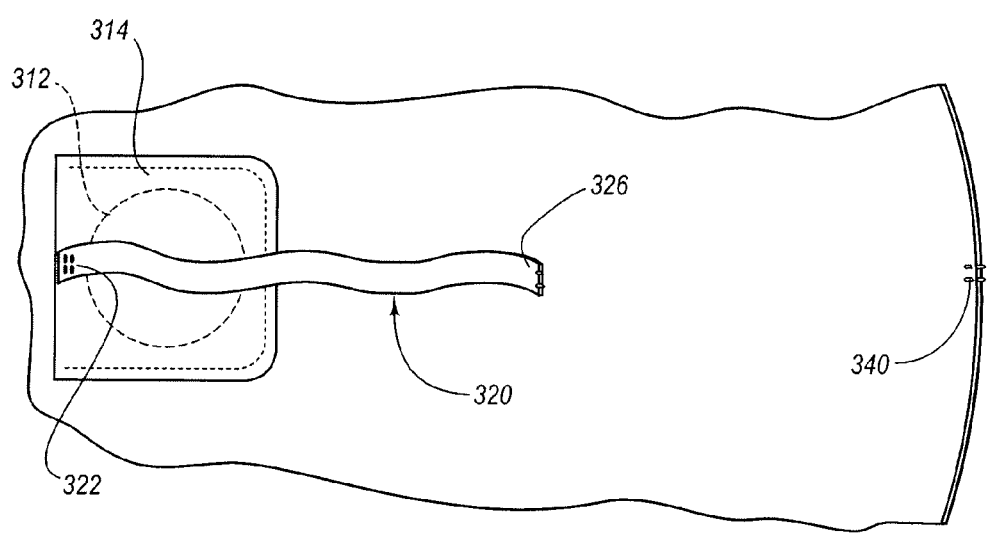
FIG. 3C is a side elevation cutaway view of the airbag assembly of FIG. 3A during unobstructed airbag deployment.

FIGS. 3A-C depict some components of another embodiment of an airbag assembly with adaptive venting for out of position occupants, wherein the airbag is in early deployment (FIG. 3A), mid-deployment, or deployment with obstruction (FIG. 3B) and full, unobstructed deployment (FIG. 3C). The airbag assembly of this embodiment is similar to that shown in FIGS. 1A-1C, and may comprise an airbag membrane 310, one or more control tethers 320, a diffuser (not shown), a fixed vent (not shown), and an exhaust port (not shown).

Airbag membrane 310 may comprise at least one aperture 312, and at least one aperture cover 314. The components of airbag assembly 300 are similar to those of airbag assembly 100, except for the differences identified in the following description.

Aperture 312 is formed in membrane 310 and is in fluid communication with the interior of membrane 310. Aperture cover 314 is attached to membrane 310 on at least three sides and is disposed over aperture 312. Control tether 320 comprises an aperture cover proximal portion 322, and elongated middle portion 324, and a membrane proximal portion 326. The cover proximal portion 322 is fixedly attached to aperture cover 314, whereas in airbag assembly 100, the cover proximal portion 122 was attached using breakaway stitching.

The elongated middle portion 324 is of sufficient length that during early airbag deployment (as in FIG. 3A) control tether 320 is slack and during mid-airbag deployment, or deployment with obstruction (FIG. 3B) it is taut. Membrane proximal portion 326 is releasably attached to membrane 310 using breakaway stitching 340 or some other suitable releasable attachment. In airbag assembly 100, the membrane proximal portion of control tether 120 was fixedly attached to membrane 110. During unobstructed airbag deployment, tension applied to control tether 320 increases until stitching 340 is ruptured, and membrane portion 326 is released from membrane 310.

Figure 4A:
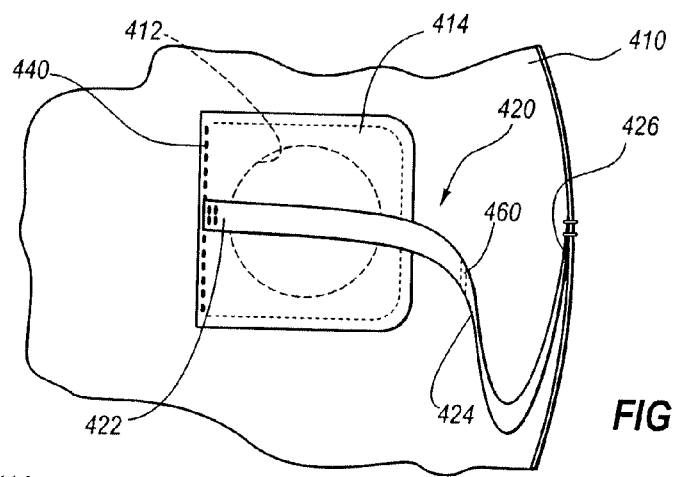
FIG. 4A is a side elevation cutaway view detailing some components of another embodiment of an airbag assembly during initial deployment.
Figure 4B:
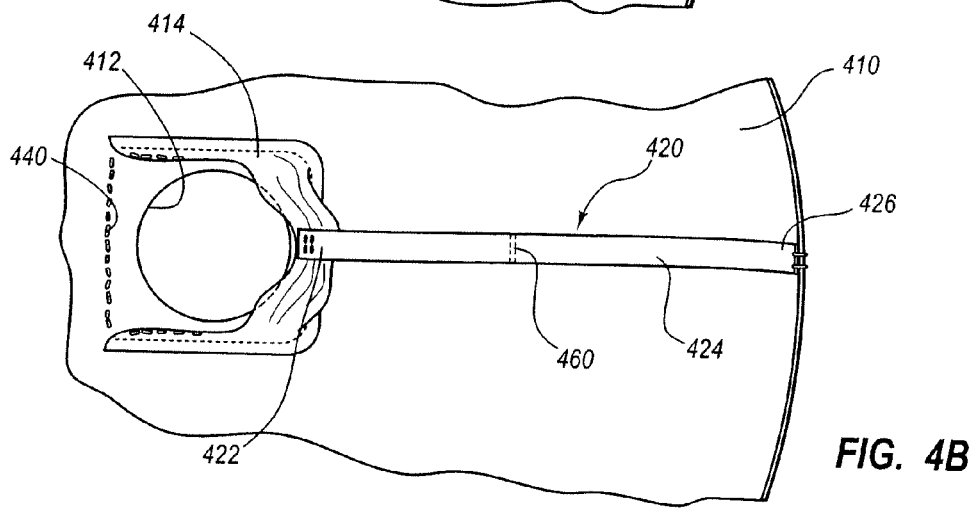
FIG. 4B is a side elevation cutaway view detailing the airbag assembly of FIG. 4A during mid-airbag deployment, or airbag deployment with obstruction.
Figure 4C:
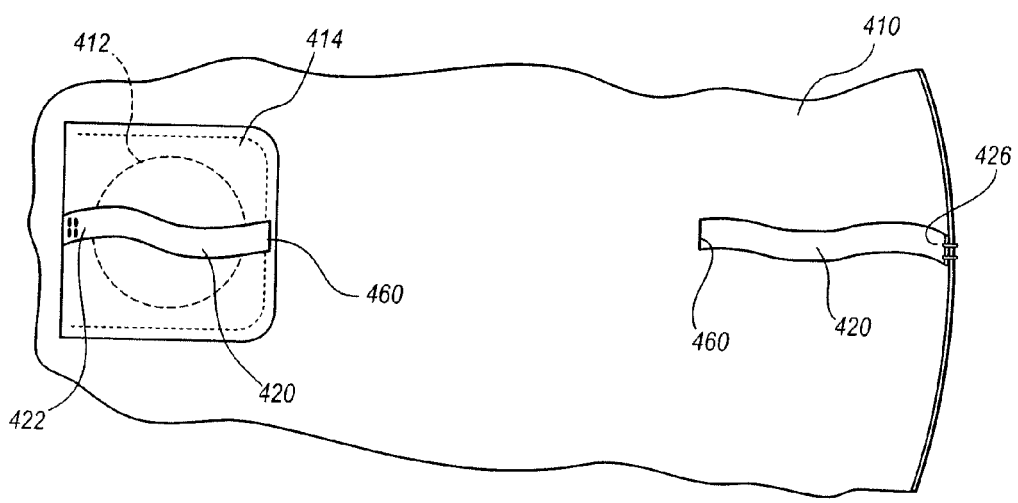
FIG. 4C is a side elevation cutaway view of the airbag assembly of FIG. 4A during unobstructed deployment.

FIGS. 4A-C depict some components of another embodiment of an airbag assembly with adaptive venting for out of position occupants, wherein the airbag is in early deployment (FIG. 4A), mid-deployment, or deployment with obstruction (FIG. 4B) and full, unobstructed deployment (FIG. 4C). The airbag assembly of this embodiment is similar to that of airbag assembly 100, and may comprise an airbag membrane 410, one or more control tethers 420, a diffuser (not shown), a fixed vent (not shown), and an exhaust port (not shown).

In this embodiment, aperture cover 414 is sewn on all 4 sides, but one of the sides is sewn with breakaway stitching 440. Additionally, control tether 420 is fixedly attached to both aperture cover 414 and membrane 410. The elongated portion 424 of control tether 420 is perforated 460.

Upon mid-airbag deployment or deployment with obstruction, breakaway stitching 440 is ruptured and one side of aperture cover 414 is pulled away from aperture 412, however perforations 460 do not rupture. Upon airbag deployment without obstruction, tension continues to be applied to control tether 420 until perforations 460 rupture, which severs control tether 420 and aperture cover 414 is released to completely cover aperture 412.

Many design variations are possible and should be considered within the scope of the invention. For example, the airbag cushion body may have a plurality of cushion vents formed therein and each of the cushion vents may have an associated vent cover attached to the cushion membrane. Control tethers may extend from each of the respective vent covers to different portions of the airbag cushion body. As such, the length with which each of the control tethers extend from their respective vent covers to the airbag cushion body may differ in accordance with design specifications.

Accordingly, the design could be tailored to adjust or fine tune the deployment and deployment forces in accordance with various occupant positions. The design could be tailored, for instance, to allow a small number of cushion vents to remain open in the event that an occupant is only slightly out of position, allow a greater number of cushion vents to remain open in the event that an occupant is further out of position, and allow most or all cushion vents to remain open in the event that an occupant is positioned very close to the airbag at the time of deployment. The design could also be tailored to account for a passenger being out of position laterally with respect to the airbag by configuring the control tethers to allow primarily the cushion vents on one side of the airbag cushion body or the other to remain open in accordance with the position of the out-of-position occupant.

Vent covers suitable for use in embodiments of the invention may be shaped and sized in a wide variety of ways as desired. Embodiments of the invention may also optionally include protruding features extending from the vent cover. Such features may be shaped and configured to interact with the gas flow and prevent "flutter" at high gas velocities. These protruding features need not be any particular shape or size. Instead, they may be shaped and sized in accordance with desired gas flow characteristics.

Embodiments disclosed herein illustrate novel techniques for venting an airbag cushion, wherein the vent is initially closed, becomes open during the course of unobstructed airbag deployment, and then becomes closed during full airbag deployment, but may retain an open vent when an occupant obstructs the path of a deploying cushion. Airbag cushions provide improved safety by deploying with less pressure when an occupant is obstructing deployment. The airbag cushions deploy with more pressure when an occupant is not obstructing deployment and when high pressure is required to provide the necessary restraint. The airbag cushions described herein have application to both driver and passenger positions. Furthermore, the airbag cushions may be configured in a variety of sizes based on design constraints.

Various embodiments for closeable vents have been disclosed herein. The closeable vents disclosed herein are examples of means for venting gas out of the airbag cushion. The vent covers, or aperture covers, disclosed herein are examples of means for selectively venting gas out of the airbag.

A control tether, aperture cover tether, or vent tether, as disclosed herein, is an example of means for restricting gas venting by moving the selective gas venting means upon inflatable airbag deployment without obstruction and enabling the vent aperture to remain uncovered upon inflatable airbag deployment with obstruction. The control tether is also an example of means for restricting gas venting by closing the venting means upon inflatable airbag deployment without obstruction and enabling the venting means to remain open upon inflatable airbag deployment with obstruction.

The combination of a closeable vent and a control tether, as disclosed herein, is an example of means for restricting gas venting by closing the venting means to cover the aperture of the venting means upon inflatable airbag deployment without obstruction and enabling the venting means to remain open upon inflatable airbag deployment with obstruction.

The breakaway stitching and the perforations disclosed herein, are examples of means for releasing the control tether (moving means).

The diffusers disclosed herein are examples of means for diffusing gas within an airbag cushion by re-directing inflation gas received from an inflator. The diffusers disclosed herein are also examples of means for diffusing gas by re-directing inflation gas to the venting means from an inflator such that the gas rapidly exits the inflatable airbag cushion via the venting means when deployment of the airbag is obstructed.

It will be apparent to those having skill in the art that changes may be made to the details of the above-described embodiments without departing from the underlying principles of the invention. Embodiments of the invention in which an exclusive property or privilege is claimed are defined as follows. Note that elements recited in means-plus-function format are intended to be construed in accordance with 35 U.S.C. §112 ¶6.

The invention claimed is:

1. An airbag assembly, comprising:
   an inflatable airbag cushion comprising a cushion membrane, which defines an interior of the inflatable airbag cushion;
   a first closeable vent and a second closeable vent, wherein each closeable vent comprises an aperture in the cushion membrane and an aperture cover positioned over each respective aperture, wherein the first closeable vent and the second closeable vent are located in opposing sides of the cushion membrane, wherein each aperture provides fluid communication for inflation gas to exit out of the interior of the inflatable airbag cushion;
   a first tether comprising a first end and a second end, which are separated by a length; and,
   a second tether comprising a first end and a second end, which are separated by a length,
      wherein the first end of the first tether and the first end of the second tether are coupled to the cushion membrane at an occupant-proximal surface,
      wherein the second end of the first tether is coupled to the aperture cover of the first closeable vent,
      wherein the second end of the second tether is coupled to the aperture cover of the second closeable vent,
      wherein each aperture cover is coupled to only a single tether,
      wherein the vents are closed before deployment,
      wherein the vents are configured to remain closed during initial deployment of the inflatable cushion airbag due to the locations of the vents, the configuration of the vents and the lengths of the tethers, and to then transition to being opened during the course of normal initial/mid-deployment of the inflatable airbag cushion or upon deployment with obstruction due to tension is applied to the aperture covers via the tethers, which pulls a portion of each aperture cover away from each respective aperture, and
      wherein the vents and the tethers are configured such that, upon deployment of the inflatable airbag cushion without obstruction and after the vents have been opened at mid-deployment of the inflatable airbag cushion, tension is released from the tethers and the vents transition from being open to being at least partially closed to enable full deployment of the inflatable airbag cushion.

2. The airbag assembly of claim 1, wherein the airbag assembly further comprises a diffuser within the inflatable airbag cushion.

3. The airbag assembly of claim 1, wherein the inflatable airbag cushion further comprises at least one fixed vent.

4. An airbag assembly, comprising:
   an inflatable airbag cushion comprising a cushion membrane, which defines an interior of the inflatable airbag cushion;
   a first closeable vent and a second closeable vent, wherein each closeable vent comprises an aperture in the cushion membrane and an aperture cover positioned over each respective aperture, wherein the first closeable vent and the second closeable vent are located in opposing sides of the cushion membrane, wherein each aperture provides fluid communication for inflation gas to exit out of the interior of the inflatable airbag cushion;
      wherein each aperture cover is anchored to the cushion membrane on a side that is opposite from a side that is unattached to the cushion membrane, such that during airbag deployment inflation gas initially passes over the attached side and then the over the unattached side of the aperture cover;

a first tether comprising a first end and a second end; and, a second tether comprising a first end and a second end, wherein the first end of the first tether and the first end of the second tether are coupled to the cushion membrane at an occupant-proximal surface, wherein the second end of the first tether is coupled to the unattached side of the first aperture cover, wherein the second end of the second tether is coupled to the unattached side of the second aperture cover, wherein each vent is coupled to only a single tether, wherein the vents are closed before deployment, wherein the vents are configured to remain closed during initial deployment of the inflatable cushion airbag due to the locations of the vents, the configuration of the vents and the lengths of the tethers, and to then transition to being opened during the course of normal initial/mid-deployment of the inflatable airbag cushion or upon deployment with obstruction due to tension applied to the unattached sides of the aperture covers via the tethers, which pulls a portion of each aperture cover away from each respective aperture, and wherein the vents and the tethers are configured such that, upon deployment of the inflatable airbag cushion without obstruction and after the vents have been opened at mid-deployment of the inflatable airbag cushion, tension is released from the tethers and the vents transition from being open to being at least partially closed to enable full deployment of the inflatable airbag cushion.

5. The airbag assembly of claim 4, wherein the airbag assembly further comprises a diffuser within the inflatable airbag cushion.

6. The airbag assembly of claim 4, wherein the inflatable airbag cushion further comprises at least one fixed vent.

7. The airbag assembly of claim 4, wherein each aperture cover has three sides that are anchored to the cushion membrane.

8. An airbag assembly, comprising:

an inflatable airbag cushion comprising a cushion membrane, which defines an interior of the inflatable airbag cushion;

a first closeable vent and a second closeable vent, wherein each closeable vent comprises an aperture in the cushion membrane and an aperture cover positioned over each respective aperture, wherein the first closeable vent and the second closeable vent are located in opposing sides of the cushion membrane, wherein each aperture provides fluid communication for inflation gas to exit out of the interior of the inflatable airbag cushion;

wherein each aperture cover is anchored to the cushion membrane on a side that is opposite from a side that is unattached to the cushion membrane, such that during airbag deployment inflation gas initially passes over the attached side and then the over the unattached side of the aperture cover;

a first tether comprising a first end and a second end; and, a second tether comprising a first end and a second end, wherein the first end of the first tether and the first end of the second tether are coupled to the cushion membrane at an occupant-proximal surface, wherein the second end of the first tether is coupled to the unattached side of the first aperture cover, wherein the second end of the second tether is coupled to the unattached side of the second aperture cover, wherein each vent is coupled to only a single tether, wherein the vents are closed before deployment, wherein the vents are configured to remain closed during initial deployment of the inflatable cushion airbag due to the locations of the vents, the configuration of the vents and the lengths of the tethers, and to then transition to being opened during the course of normal initial/mid-deployment of the inflatable airbag cushion or upon deployment with obstruction due to tension applied to the unattached sides of the aperture covers via the tethers, which pulls a portion of each aperture cover away from each respective aperture and towards the occupant-proximal surface, and wherein the vents and the tethers are configured such that, upon deployment of the inflatable airbag cushion without obstruction and after the vents have been opened at mid-deployment of the inflatable airbag cushion, the tethers rupture when a predetermined amount of tension is placed on the tethers and the tethers ceases to couple the force of the expanding airbag cushion membrane to the respective closeable vents, which allows the vents to transition from being open to being at least partially closed to enable the full deployment of the inflatable airbag cushion.

9. The airbag assembly of claim 8, wherein the airbag assembly further comprises a diffuser within the inflatable airbag cushion.

10. The airbag assembly of claim 8, wherein the inflatable airbag cushion further comprises at least one fixed vent.

11. The airbag assembly of claim 8, wherein the tethers ruptures via breakaway stitching being pulled free.

12. The airbag assembly of claim 8, wherein the tethers are attached to the airbag membrane using breakaway stitching, which causes the tethers to pull free from the airbag membrane when the tethers are exposed to a predetermined amount of tension.

13. The airbag assembly of claim 8, wherein the tethers are attached to the respective closeable vents using breakaway stitching, which causes the tethers to pull free from the respective closeable vents when the tethers are exposed to a predetermined amount of tension.

14. The airbag assembly of claim 8, wherein the tethers further comprises perforations, and the tethers ruptures at the perforations when exposed to a predetermined amount of tension.

15. The airbag assembly of claim 8, wherein each aperture cover has three sides that are anchored to the cushion membrane.

* * * * *